UNITED STATES PATENT OFFICE.

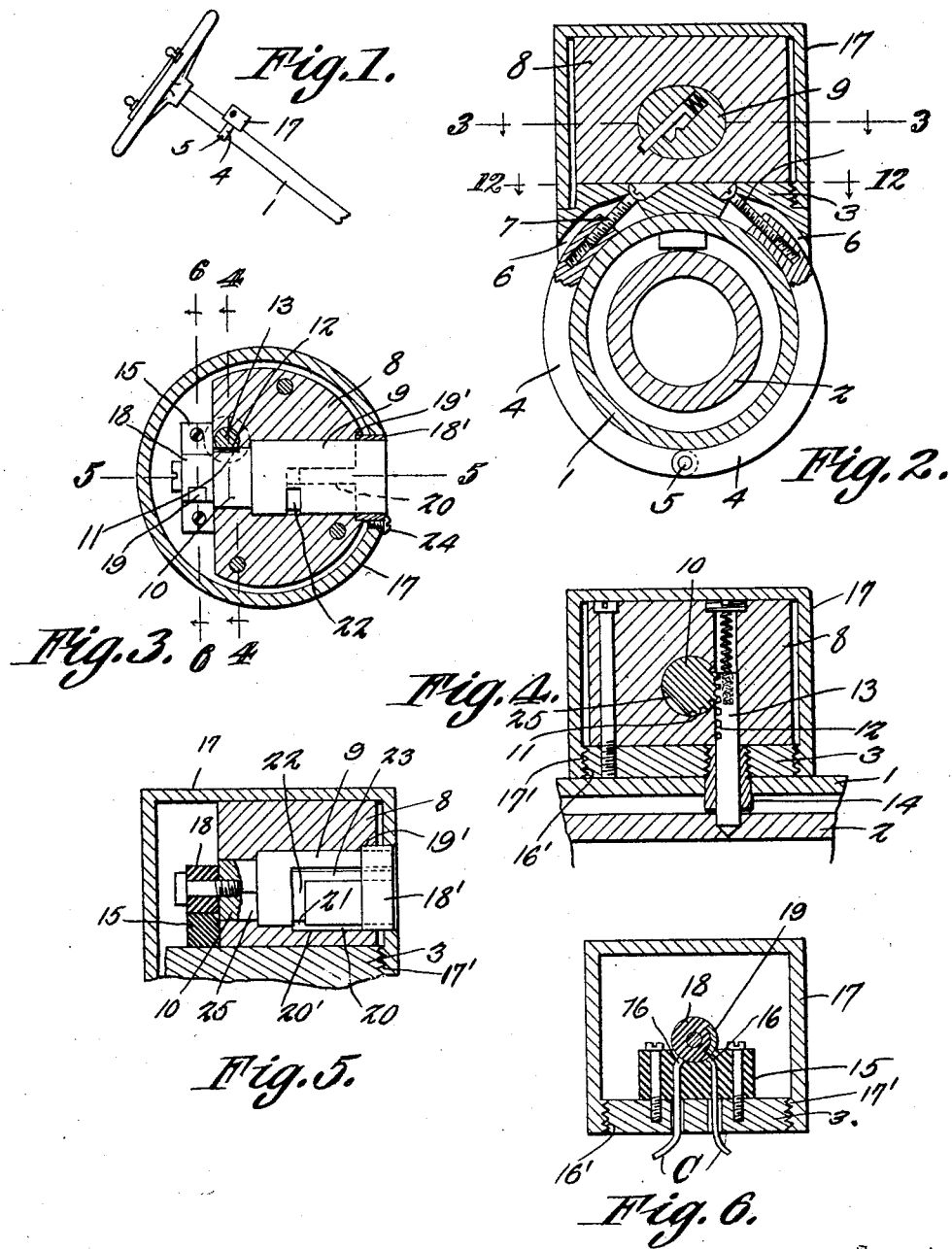

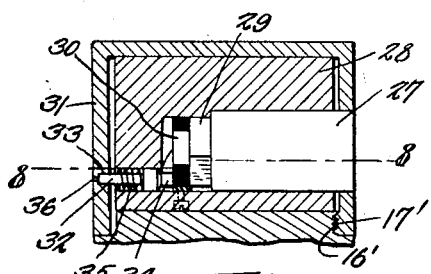
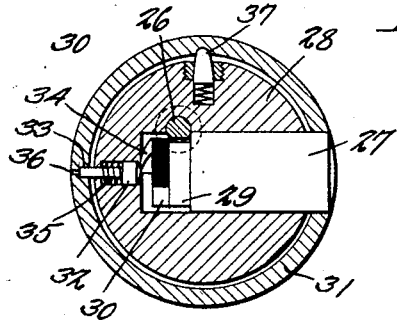
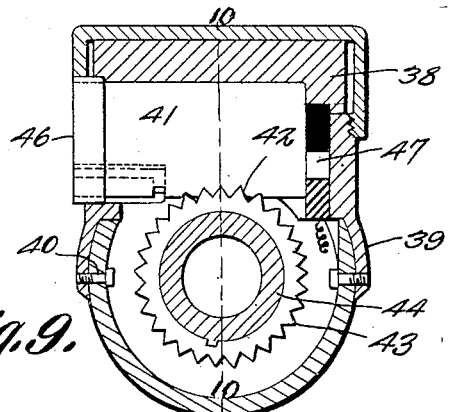
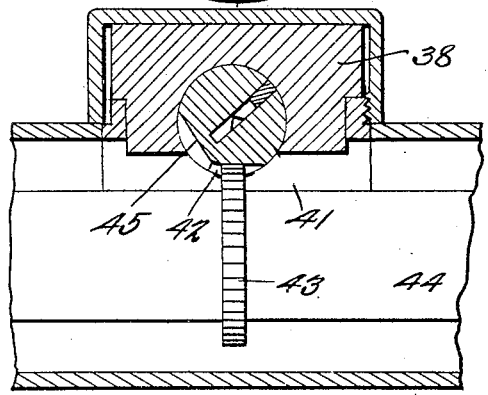
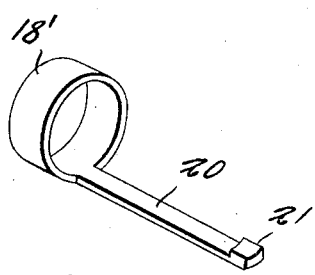
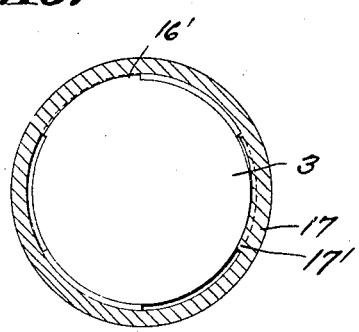

JOHN OWEN RITTER, OF CLARKSBURG, WEST VIRGINIA, ASSIGNOR OF ONE-HALF TO WILLIAM E. SMITH, OF CLARKSBURG, WEST VIRGINIA.

STEERING-POST LOCK.

1,331,942.   Specification of Letters Patent.   Patented Feb. 24, 1920.

Application filed March 22, 1919. Serial No. 284,285.

*To all whom it may concern:*

Be it known that I, JOHN O. RITTER, a citizen of the United States, residing at Clarksburg, in the county of Harrison and State of West Virginia, have invented a new and useful Steering-Post Lock, of which the following is a specification.

This invention relates to a locking device for the steering column of motor propelled vehicles and has for its object the provision of a compact device, easily attached to the steering column and that will effectually lock the steering post against use by an unauthorized person.

Another object is, provision whereby the engine of the vehicle is rendered inoperative, so long as the steering post is locked, preventing, not only unauthorized use of the car, but injury to the owner thereof, should he try to start the car before unlocking the steering wheel.

Another object in view is an assembly of interlocking parts that are locked together only when the steering post is locked.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawing: Figure 1 is a view in elevation of a steering column provided with a device forming the subject of this invention.

Fig. 2 is a transverse sectional view through the lock and steering column.

Fig. 3 is a plan sectional view on line 3—3 of Fig. 2.

Fig. 4 is a sectional view on line 4—4 of Fig. 3.

Fig. 5 is a sectional view on line 5—5 of Fig. 3.

Fig. 6 is a sectional view on line 6—6 of Fig. 3.

Fig. 7 is a sectional view of a modified form of lock.

Fig. 8 is a sectional view on line 8—8 of Fig. 7.

Fig. 9 is a sectional view of another modification.

Fig. 10 is a sectional view taken on line 10—10 of Fig. 9.

Fig. 11 is a perspective view of a locking ring used as a part of the structure illustrated in Figs. 1 to 6, inclusive, and Figs. 9 and 10.

Fig. 12 is a sectional view on line 12—12 of Fig. 2 and may be taken to illustrate the connection between the base and housing in all the figures.

Referring to the drawing, 1 designates a steering column and 2 the steering post, to which the steering wheel of a vehicle is attached.

To the steering column 1 is attached a base 3, by means of a clip comprising two segmental arms 4, pivotally jointed at 5, the free ends of the arms 4 enter slots 6 formed in the base 3 and are engaged by screw bolts 7, the heads of which are curved on the under side and the slots 6 are enlarged sufficiently, that the arms 4 may be swung laterally, to embrace a steering column of greater or less diameter.

Secured to the base 3 is a block 8, which to all intents and purposes is a part of the base, this block has mounted for rotation therein a transversely disposed, key controlled tumbler lock barrel 9, such, for instance, as the Yale, or similar multi-tumbler lock. Mounted on the end of the lock barrel is a gear disk 10 provided with a segmental tooth portion 11 which is adapted to engage teeth 12 formed on a spring actuated plunger 13, mounted for longitudinal movement in a sleeve 14, said sleeve being screw threaded to the base 3, the plunger is adapted to enter the steering column and engage the steering post 2 as shown in Fig. 4.

Secured to the base 3 is a block 15 of insulating material provided with spaced terminals 16 which form a break in the ignition circuit C to the engine. A disk of insulating material 18 is secured to the disk 10 and carries a segmental metal strip 19, adapted to fit the block 15 and bridge the terminal 16 when the plunger is in unlocked position.

The base 3 is provided with a screw-threaded portion 16', adapted to be engaged by the internally threaded portion 17' of a cap or housing 17; the thread is removed at diametrically opposite spaces, from each of the members 3 and 17, leaving equally spaced blank and threaded places on each member that they may be easily assembled.

A retaining ring 18', encircles the outer end of the lock barrel and is seated in a groove 19' formed in the block 8, its outer end being flush with the surface of the cap 17; this prevents removal of the cap from the base. To prevent removal of the ring, a finger 20 extends from the ring 18' through a groove 20' into the block 8 and has at its extremity a projection 21 in engagement with a peripheral groove 22 formed in the lock barrel. A longitudinal groove 23 is also cut in the lock barrel from the groove 22 to the outer end of the barrel; these slots are so positioned, with relation to the projection 21, that when the barrel is in locked position the projection is in that end of the groove 22 remote from the groove 23 and the ring cannot therefore be removed. On the other hand, when the barrel is in unlocked position, the projection is in line with the groove 23 and the ring may be removed. A screw 24 is placed in the cap 17, close beside the ring 18', with the head overlapping the ring, this prevents accidental displacement of the ring when the barrel is unlocked.

The gear disk 10 is cutaway or flattened as shown at 25, so that after inserting the lock barrel in the base, the plunger may be inserted and the teeth on same be in position to properly mesh with the teeth on the disk.

In the modification shown in Figs. 7 and 8, the device is attached to the steering column in the same manner described with reference to Figs. 1 to 6 inclusive, and a plunger 26 operates to lock the steering post in the same manner as the plunger 13. A lock barrel 27 mounted in a base 28, has secured to its inner end a gear disk 29 for operating the plunger, also a bridging block 30, for breaking the ignition circuit, and a cap member 31 houses the mechanism; all as hereinbefore described. To lock the housing and base together, instead of the ring 18', a plunger 32 is mounted in the base 28 and is adapted to be projected into an opening 33 in the cap 31 and lock the two members together. A cam 34 is secured to the end of the lock barrel and overrides the end of the plunger 32, to advance the same, against the action of a compression spring 35, into the opening 33. The cam 34 operates to advance the plunger 32 when the barrel is in locking position. A small hole 36 is counterbored in the hole 33, to communicate with the outside of the housing so that should the spring 35 fail to withdraw the plunger, a pin may be inserted to unseat the plunger.

A spring actuated pin 37 mounted in the base, engages the cap to hold the same in position when the plunger 32 is disengaged therefrom.

In the modification shown in Figs. 9 and 10, a base member 38 is carried by a plate 39 secured from the inside of the steering column by screws 40. Mounted for rotation in the base 38 is a key controlled lock barrel 41 having teeth 42 cut on its periphery, said teeth being adapted to be brought into mesh with a toothed disk 43 secured to the steering wheel post 44 and lock the post against movement to steer the car.

It is to be understood that the disk 43 may be of any desired polygonal shape that will fit a like shaped surface on the lock barrel, when the same is in locked position.

A portion of the lock barrel is cut away as shown at 45 which permits the lock barrel to be moved out of engagement with the disk 42 to unlock the steering post.

A retaining ring 46 for preventing removal of the housing is provided and is identical with the ring 18', a detail description is therefore considered unnecessary, the same may also be said of a circuit breaking device 47 which duplicates the parts 15, 16, 18 and 19.

Although the preferred embodiment of the invention has been shown it is to be understood that slight changes may be made within the scope of the appended claims without departing from the spirit or sacrificing any of the advantages thereof.

Having thus described my invention, what is claimed is:—

1. In a device of the class described, a casing; a steering post journaled in the casing; a base carried by the casing; a housing on the base; a lock barrel; means interposed between the barrel and the post and coacting with the barrel and the post to hold the post against rotation; and a sleeve surrounding the barrel to prevent rotation of the housing on the base.

2. In a device of the class described, a casing; a steering post journaled in the casing; a base carried by the casing; a housing on the base; a lock barrel journaled in the base and provided with teeth; a toothed element coacting with the teeth of the barrel and with the post to hold the post against rotation; and a sleeve surrounding the barrel to prevent rotation of the housing on the base.

3. In a device of the class described, a casing; a steering post journaled in the casing; a base carried by the casing; a housing on the base; a lock barrel journaled in the base; means interposed between the barrel and the post and coacting with the barrel and the post to hold the post against rotation; a sleeve surrounding the barrel and provided with an arm the arm and the barrel having interengaging elements coöperating to hold the barrel in the base; and means for securing the sleeve to the housing.

4. In a device of the class described, a casing, a steering post journaled in the casing; a base carried by the casing; a housing on the base; a lock barrel journaled in the base; means interposed between the barrel and the post and coacting with the barrel and the post to hold the post against rotation; a sleeve surrounding the barrel and provided with an arm, the arm having a projection engaging a slot in the barrel to hold the barrel in the base; and means for securing the sleeve to the housing.

In testimony that I claim the foregoing as my own I have hereto affixed my signature in the presence of two witnesses.

JOHN OWEN RITTER.

Witnesses:
JOHN GEORGE HESS,
CHAS. B. SWIGER.